(No Model.)

T. McKEETHEN.
LEMON SQUEEZER.

No. 330,505. Patented Nov. 17, 1885.

Witnesses:
jwmaille
W. B. Dodson.

Inventor:
Taylor McKeethen
by W. R. Stringfellow
Attorney

N. PETERS, Photo-Lithographer, Washington, D. C.

UNITED STATES PATENT OFFICE.

TAYLOR McKEETHEN, OF NEW ORLEANS, LOUISIANA.

LEMON-SQUEEZER.

SPECIFICATION forming part of Letters Patent No. 330,505, dated November 17, 1885.

Application filed February 2, 1885. Serial No. 154,758. (No model.)

*To all whom it may concern:*

Be it known that I, TAYLOR MCKEETHEN, a resident of the city of New Orleans, parish of Orleans, in the State of Louisiana, have invented a new and useful Improvement in Lemon-Squeezers, which improvement is fully set forth in the following specification, reference being had to the accompanying drawings.

My invention relates to certain new and useful improvements in squeezers for extracting the juice from lemons and like fruit; and it consists in the novel combination of parts hereinafter described, and specifically pointed out in the claim.

Figure 1:
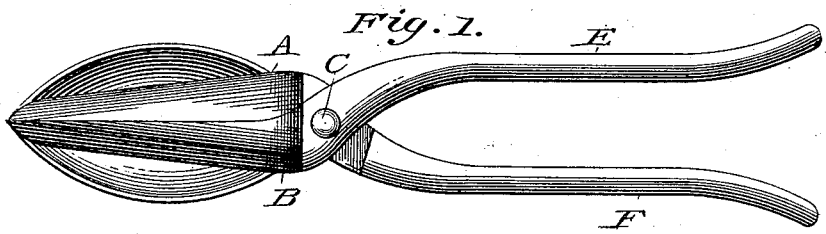
Figure 2:
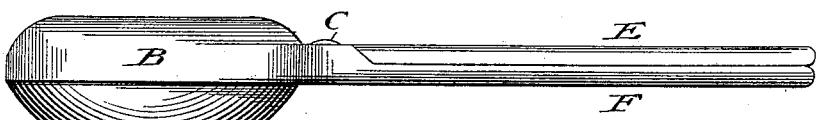
Figure 3:
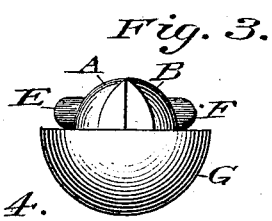
Figure 4:
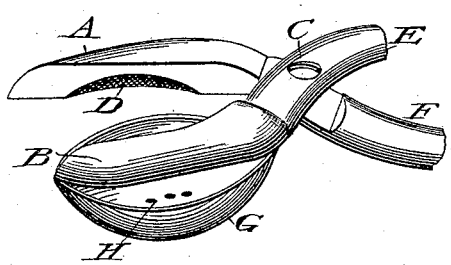
Figure 5:
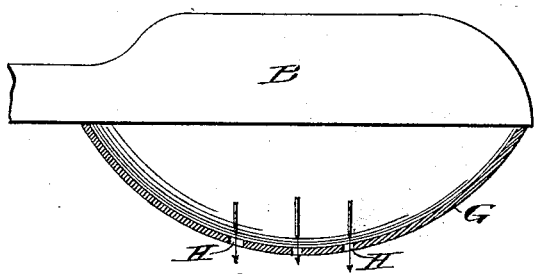
Figure 6:
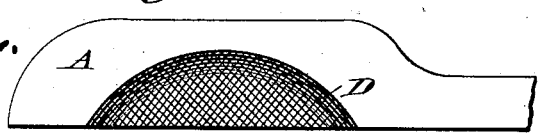

Referring to the accompanying drawings, wherein like letters indicate like parts throughout the several views, Figure 1 represents a plan view of my improved squeezer. Fig. 2 represents a side elevation, and Fig. 3 an end elevation thereof. Fig. 4 represents a perspective of the same. Fig. 5 represents a side elevation and partial section, and Fig. 6 a side elevation of one of the squeezing-jaws.

A and B indicate the jaws of the squeezer, pivoted together at C, and provided with the operating-handles E and F. These jaws are provided with opposite homologous cavities, D, having internal roughened or corrugated surfaces, as shown, to retain the fruit in place during the squeezing operation. To one of the jaws, B, is attached the juice-receiving cup and strainer G, provided with the basal perforations H, which permit the escape of the juice. The material of construction should be chosen with the view of resisting the corrosive action of the fruit acids as far as practicable, and of attaining the desired degree of strength and durability.

The operation of the device is apparent from the drawings and description. The squeezer being held in a horizontal position, and the lemon or other fruit being placed between the jaws, the latter are, by means of the handles, caused to approach each other, expressing the juice into the straining-cup.

Having thus described my invention, what I claim, and desire to secure by Letters Patent, is—

The combination, with the horizontally-pivoted jaws A B, each having a cavity, D, and an operating-handle, of the straining-cup G, attached to one of said jaws, substantially as described.

TAYLOR McKEETHEN.

Witnesses:
ANDREW HERO, Jr.,
JNO. I. WARD.